(12) United States Patent  (10) Patent No.: US 9,137,286 B1
Yuan  (45) Date of Patent: Sep. 15, 2015

(54) STREAMING TRAFFIC CLASSIFICATION METHOD AND APPARATUS

(71) Applicant: MARVELL INTERNATIONAL LTD., Hamilton (BM)

(72) Inventor: Donglei Yuan, Fremont, CA (US)

(73) Assignee: Marvell International Ltd., Hamilton (BM)

( * ) Notice: Subject to any disclaimer, the term of this patent is extended or adjusted under 35 U.S.C. 154(b) by 117 days.

(21) Appl. No.: 14/076,811

(22) Filed: Nov. 11, 2013

Related U.S. Application Data

(63) Continuation of application No. 11/939,324, filed on Nov. 13, 2007, now Pat. No. 8,583,821.

(60) Provisional application No. 60/867,280, filed on Nov. 27, 2006.

(51) Int. Cl.
G06F 15/16 (2006.01)
H04L 29/06 (2006.01)
H04N 7/173 (2011.01)
H04N 21/2385 (2011.01)

(52) U.S. Cl.
CPC .......... *H04L 65/608* (2013.01); *H04N 7/17336* (2013.01); *H04N 21/2385* (2013.01)

(58) Field of Classification Search
None
See application file for complete search history.

(56) References Cited

U.S. PATENT DOCUMENTS

| | | | |
|---|---|---|---|
| 6,570,080 B1 * | 5/2003 | Hasegawa et al. | 84/609 |
| 6,614,803 B1 * | 9/2003 | Farnsworth et al. | 370/465 |
| 6,640,248 B1 | 10/2003 | Jorgensen | |
| 6,981,036 B1 * | 12/2005 | Hamada | 709/223 |
| 7,502,836 B1 * | 3/2009 | Menditto et al. | 709/217 |
| 7,664,872 B2 * | 2/2010 | Osborne et al. | 709/232 |
| 7,738,415 B2 * | 6/2010 | Chou | 370/328 |
| 7,907,970 B2 * | 3/2011 | Park et al. | 455/561 |
| 8,155,077 B2 * | 4/2012 | Grayson | 370/331 |
| 8,166,118 B1 | 4/2012 | Borghetti | |
| 2002/0023080 A1 * | 2/2002 | Uga et al. | 707/1 |
| 2003/0005455 A1 * | 1/2003 | Bowers | 725/90 |
| 2003/0079016 A1 * | 4/2003 | Tsao | 709/226 |
| 2005/0027875 A1 * | 2/2005 | Deng | 709/231 |
| 2005/0198268 A1 * | 9/2005 | Chandra | 709/224 |
| 2005/0207411 A1 * | 9/2005 | Ota et al. | 370/389 |
| 2006/0020589 A1 * | 1/2006 | Wu et al. | 707/3 |

(Continued)

OTHER PUBLICATIONS

Telecommunications and information exchange between systems—Local and metropolitan area networks—Specific Requirements, Part 11: Wireless Medium Access Control (MAC) and Physical Layer (PHY) Specifications: Amendment 7: Medium Access Control (MAC) Quality of Service (QoS) Enhancements, IEEE P802.11e/D11.0, 1-195, Oct. 2004.

*Primary Examiner* — Hamza Algibhah
*Assistant Examiner* — James Edwards (57) ABSTRACT

In a method of classifying streaming media data, one or more media servers are identified. In response, the media servers are added to a list of media servers. It is determined that one or more messages sent by one or more clients are sent to a first media server included on the list of media servers. In response, the one or more clients are added to a list of clients that is associated with the first media server. It is determined that a request for streaming media is sent to the first media server by a first client included on the list of clients. In response, a rule to determine whether subsequent traffic between the first media server and the first client is utilized. Data packets within the subsequent traffic are classified as high priority when the data packets satisfy the rule.

20 Claims, 9 Drawing Sheets

(56) References Cited

U.S. PATENT DOCUMENTS

| | | |
|---|---|---|
| 2006/0126536 A1* | 6/2006 | Patel et al. .................... 370/254 |
| 2006/0136987 A1* | 6/2006 | Okuda ............................. 726/1 |
| 2006/0146703 A1* | 7/2006 | Cha et al. ...................... 370/229 |
| 2006/0168126 A1* | 7/2006 | Costa-Requena et al. .... 709/219 |
| 2006/0251129 A1* | 11/2006 | Morimura et al. ............. 370/503 |
| 2006/0268793 A1* | 11/2006 | Zanaty .......................... 370/338 |
| 2007/0127394 A1* | 6/2007 | Stirbu et al. ................... 370/254 |
| 2007/0195815 A1* | 8/2007 | Turner et al. .................. 370/465 |
| 2007/0256105 A1* | 11/2007 | Tabe ............................... 725/78 |
| 2007/0258418 A1* | 11/2007 | Wurtenberger et al. ...... 370/338 |
| 2007/0265973 A1* | 11/2007 | Kahn .............................. 705/57 |
| 2008/0028093 A1* | 1/2008 | Pickens et al. ................ 709/231 |
| 2008/0144621 A1* | 6/2008 | Huang et al. .................. 370/390 |
| 2008/0282083 A1* | 11/2008 | Risan et al. ................... 713/153 |
| 2009/0013347 A1* | 1/2009 | Ahanger et al. ................ 725/36 |

\* cited by examiner

Rules: Example

Check Source IP Address for Source IP address detected from earlier Ethernet Broadcast message Check Destination IP Address for Dest. IP address Associated earlier with Source IP address Check Source Port No. for Source Port No. Associated earlier with Source IP address Check Destination Port No. for Dest. Port No. Associated earlier with Source IP address

STREAMING TRAFFIC CLASSIFICATION METHOD AND APPARATUS

CROSS-REFERENCE TO RELATED APPLICATION

This application is a continuation of U.S. patent application Ser. No. 11/939,324 (now U.S. Pat. No. 8,583,821), entitled "Streaming Traffic Classification Method and Apparatus" and filed on Nov. 13, 2007, which claims the benefit of U.S. Provisional Patent Application No. 60/867,280, entitled "Video Traffic Classification Mechanism" and filed on Nov. 27, 2006. The disclosures of the above-identified patent applications are hereby incorporated herein by reference.

FIELD OF TECHNOLOGY

The present invention relates generally to classifying communications data being sent from one device to another so that streamed data can be handled differently than other types of data.

DESCRIPTION OF THE RELATED ART

An ever-increasing amount of data is being transmitted between computers and other devices over communications pathways such as the Internet, other public communication networks, and private communications networks. Much of the increase in load over existing communications pathways is due to an increased use of streaming media data applications.

For example, streaming media data such as video data, audio data, voice over IP (VoIP), IP-TV, etc. requires much more data and/or has much stricter latency requirements than text data. For instance, the nature of streaming media data is that potentially large amounts of data need to be sent from the transmitting device or computer to the receiving device or computer without having a certain amount of data lost and/or without much delay between portions of the data. For example, lost video data or delays between received portions of video data may cause significant degradation of the video during playback. Techniques that use only a best effort attempt at delivering the streaming media data are not sufficient for the future development of multimedia networks. Routers and other devices used to transfer data including the streaming media data from a source to a destination are being designed to support quality of service (QoS) features in delivering streaming media data across wireless networks. For instance, IEEE Standard 802.11e (802.11e) currently is being developed to address this issue. Specifically, 802.11e is a wireless LAN standard which defines how to prioritize data when preparing the data for transmission to wireless devices. 802.11e allows channel access to certain stations based on which station is sending the traffic and includes the prioritization of data, voice, and video transmissions.

SUMMARY

In an embodiment, a method of classifying, at a wireless access point (AP), streaming media data includes identifying, at the wireless AP, one or more media servers, in response to identifying the one or more media servers, adding, at the wireless AP, the one or more media servers to a list of media servers maintained at the wireless AP, determining, at the wireless AP, that one or more messages sent by one or more clients are sent to a first media server included on the list of media servers, in response to determining that the one or more messages sent by the one or more clients are sent to the first media server included on the list of media servers, adding, at the wireless AP, the one or more clients to a list of clients that is (i) maintained at the wireless AP and (ii) associated with the first media server, determining, at the wireless AP, that a request for streaming media is sent to the first media server included on the list of media servers by a first client included on the list of clients associated with the first media server, in response to determining that the request for streaming media is sent to the first media server included on the list of media servers by the first client included on the list of clients, utilizing, at the wireless AP, a rule to determine whether subsequent traffic between the first media server included on the list of media servers and the first client included on the list of clients is streaming media traffic, and classifying, at the wireless AP, data packets within the subsequent traffic as high priority when the data packets satisfy the rule.

In another embodiment, a wireless AP device includes a relationship database configured to store (i) a list of media servers and (ii) a respective list of clients for each media server on the list of media servers, a rules database configured to store a plurality of rules, and a monitor module. The monitor module is configured to identify one or more media servers, in response to the monitor module identifying the one or more media servers, add the one or more media servers to the list of media servers, determine that one or more messages sent by one or more clients are sent to a first media server included on the list of media servers, in response to the monitor module determining that the one or more messages sent by the one or more clients are sent to the first media server included on the list of media servers, add the one or more clients to the list of clients that is (i) stored in the relationship database and (ii) associated with the first media server, and determine that a request for streaming media is sent to the first media server included on the list of media servers by a first client included on the list of clients associated with the first media server. The wireless AP device also includes a classification module configured to, in response to the monitor module determining that the request for streaming media is sent to the first media server included on the list of media servers by the first client included on the list of clients, utilize a rule to determine whether subsequent traffic between the first media server included on the list of media servers and the first client included on the list of clients is streaming media traffic, and classify data packets within the subsequent traffic as high priority when the data packets satisfy the rule.

In another embodiment, a tangible, non-transitory computer-readable memory storing instructions that, when executed by one or more processors, cause the one or more processors to identify one or more media servers, in response to identifying the one or more media servers, add the one or more media servers to a list of media servers maintained at a wireless AP, determine that one or more messages sent by one or more clients are sent to a first media server included on the list of media servers, in response to determining that the one or more messages sent by the one or more clients are sent to the first media server included on the list of media servers, add the one or more clients to a list of clients that is (i) maintained at the wireless AP and (ii) associated with the first media server, determine that a request for streaming media is sent to the first media server included on the list of media servers by a first client included on the list of clients associated with the first media server, in response to determining that the request for streaming media is sent to the first media server included on the list of media servers by the first client included on the list of clients, utilize a rule to determine whether subsequent traffic between the first media server included on the list of media servers and the first client included on the list of clients is streaming media traffic, and classify data packets within the subsequent traffic as high priority when the data packets satisfy the rule.

DETAILED DESCRIPTION

Embodiments of systems, apparatus, and methods described below permit a device, such as a wireless access point in a wireless network, to identify and classify streaming media data within other types of data being transferred via the wireless network. This may permit the subsequent handling of the classified streaming media data according to quality of service (QoS) mechanisms supported by the device. For example, streaming media data may be given a higher priority than web page data.

Generally speaking, in the embodiments described below, data that has been transmitted or is to be transmitted via the wireless network is monitored and analyzed to identify and classify streaming media data. For instance, media servers can be identified from their association with particular packets types. Then, data to and/or from an identified media server can be monitored to identify streaming media data. For example, one way of identifying streaming media data may include monitoring packets to and/or from a media server to identify a steaming media data request. After the streaming media data request is identified, subsequent data sent from the media server to the requesting client can be classified as streaming media data.

Figure 1:
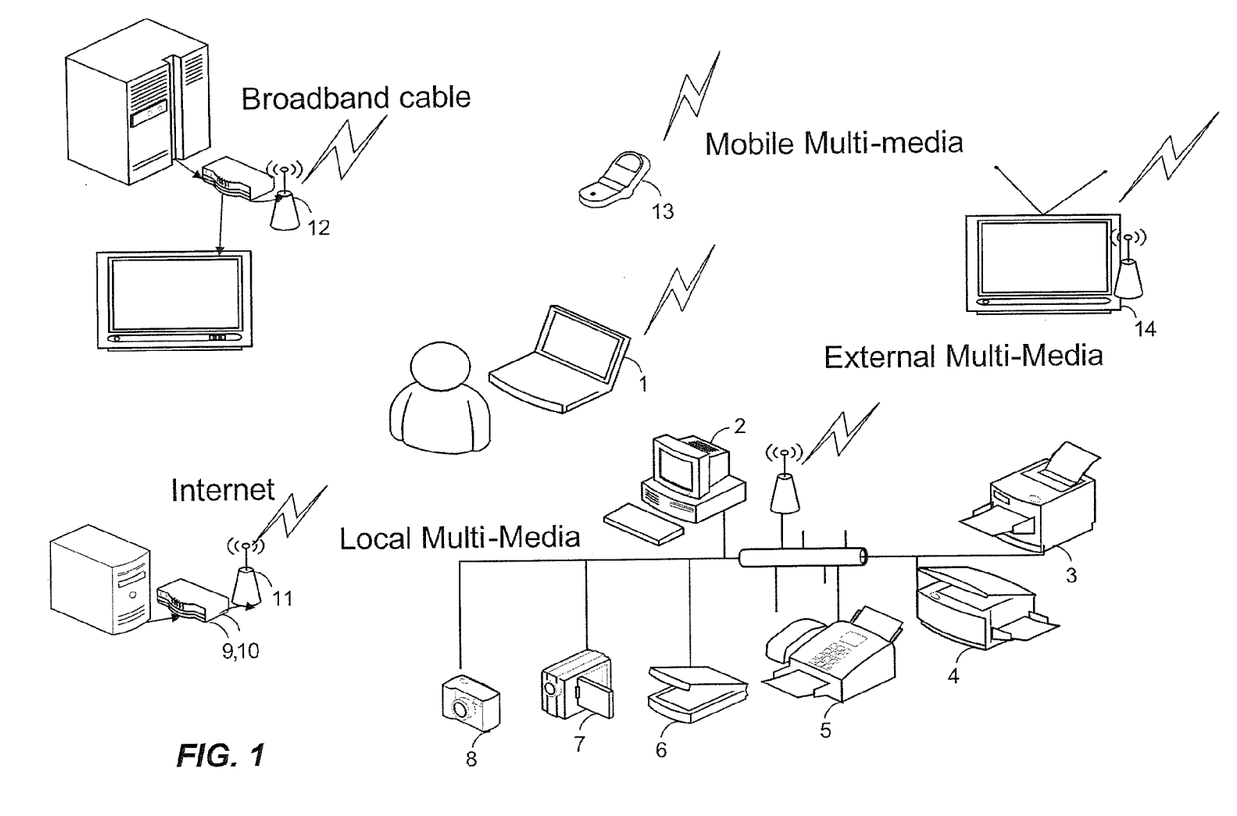
FIG. 1 is a diagram of some of the types of communications devices that may interoperate to transfer streaming media data to and from one another with embodiments of the present invention.

FIG. 1 is a block diagram of an example system in which that may utilize streaming media identification/classification techniques. The system of FIG. 1 includes a variety of different types of communications devices that may receive from and/or transmit streaming media data from another device via a wireless network. For example, a wireless device 14 receives multi-media information from sources such as satellite television (TV), High-definition television (HDTV), broadcast TV, Internet provided-TV or media, etc. The data received from these types of different sources will be transformed into wireless data such as Ethernet Data, etc. to be transmitted to a local wireless data receiving device such as a laptop computer 1, a home computer 2, a mobile multimedia device 13, other wireless multimedia receiving devices, etc.

If other data besides streaming media data is also being transmitted from, for example, the wireless device 14 with no quality of service procedure, then playback of the streaming media data may have unacceptable quality. For example, a media server can also provide services such as file sharing, file transfer protocol (ftp) services, and web server services, etc., as in the case of a home personal computer (PC) or Network Access server (NAS), etc. installed with media software, etc. Also, a device receiving streaming media could also receive non-streaming media data such as file transfers, web pages, email, etc. Thus, it may be difficult to identify streaming media data traffic in a wireless network.

To improve quality of service at the multimedia receiving device, a wireless access point device located near the receiving device can classify the streaming media data as higher priority when transmitting streaming media data to the receiving device. Any of the devices shown in FIG. 1 or similar devices, etc. can use the streaming media data classification method, system, and apparatus to improve quality of service at a streaming media data receiving device. Any of the devices listed in FIG. 1 and similar devices, etc. can be local streaming media data transmitters and/or receivers which employ the streaming media data classification method, system, and apparatus.

The devices shown in FIG. 1 and similar devices, etc. may employ different protocols that are designed for their particular system specifications. For example, the internet access point device 11 may include protocols specified by the Digital Living Network Alliance (DNLA) or other organizations, etc. or more common Internet protocols such as Transmission Control Protocol/Internet Protocol (TCP/IP).

To ease explanation of embodiments of the present invention, a brief description of Internet protocols is presented. Internet protocols include standard protocols and formats, such as TCP/IP, Hypertext Transfer Protocol (HTTP), Hypertext markup Language (HTML), User Datagram Protocol (UDP), Datagram Congestion Control Protocol (DCCP), and Stream Control Transmission Protocol (SCTP), etc. TCP is a protocol in which the transmitting computer and the receiving computer form a connection and maintain the connection for the entire time of the transfer of data. TCP requires acknowledgment messages be sent back to the transmitting device from the receiving device to confirm which packets were properly received. If the transmitting device does not receive an acknowledgment for a particular packet, the transmitting device may resend that packet. Thus, TCP provides some confidence that the data will arrive more safely and correctly.

UDP is a protocol in which the computer transmitting the information packages the information into packets, and devices between the transmitting computer and the receiving computer are relied upon to get the packet to its destination. UDP does not have the overhead required by TCP in maintaining the connection because UDP does not use an acknowledgment feature like the one described above with respect to TCP. UDP does not resend packets, and sends packets without acknowledgments from the receiving device. TCP is more complicated and more commonly used over the Internet. But for transmitting streaming media data such as voice and video, etc., UDP is more commonly used. This is because audio data or video data being played back in real time essentially requires a continuous stream and when packets are not received there typically is no time to resend the missing packet.

With both TCP and UDP, information such as identifiers of the transmitting and receiving devices and identifiers of particular ports of these devices reside in the protocol messaging between the transmitting and receiving devices. For example, IP addresses and TCP or UDP ports may be used depending on the particular protocol used to send the data. An IP address may have many ports associated with it. The ports may be designated as TCP or UDP ports or any other protocol port designation. For example, one IP address may have 65,535 TCP ports and 65,535 UDP ports depending upon which particular protocol is being used. Many well-known applications have a specific TCP and/or UDP port to which they read and/or write, and this information may be registered with an organization called the Internet Assigned Numbers Authority (IANA).

Recently there has been greater use of wireless technologies to stream video data to and from devices. Wireless Access Points (APs) help to connect wireless communication devices together to form a wireless network. The APs are usually communicatively couple to a wired network to relay data between wireless devices and the wired network but may also relay data between several wireless devices. To provide quality of service (QoS) features over wireless networks, the Wi-Fi Alliance developed the Wi-Fi Alliance interoperability certification. This certification is based on the IEEE 802.11e draft standard. WiFi Multimedia (WMM) prioritizes traffic according to four Access Categories—voice, video, best effort, and background. However many multimedia applications do not take advantage of these features. At least some embodiments of the present invention may allow devices such as wireless APs to identify streaming media data so that such data can be handled differently than other types of data and thus allow use of QoS mechanisms.

It is to be understood that although example methods and devices are described herein with respect to particular communication protocols that utilize particular data patterns that may be used to identify streaming media data, different protocols also may be used and these other protocols may have different data patterns. For instance, other implementations may operate according to other protocols such as Bluetooth, Ethernet, Universal Plug and Play (UPnP®) protocols, the Digital Living Network Alliance (DLNA), etc.

For example, UPnP architecture allows devices to support entertainment content in any format and over any transfer protocol. The IP can provide the unifying framework for applications that use different transport technology. Notably, IP versions are being produced and standardized by the Engineering Task Force so that greater functionality can be introduced. Further, HTTP and RTP protocols and DLNA media transfer modes (streaming media, interactive transfer, and background transfer) may also be utilized. All of these protocols are interoperable with embodiments of the present invention.

Figure 2:
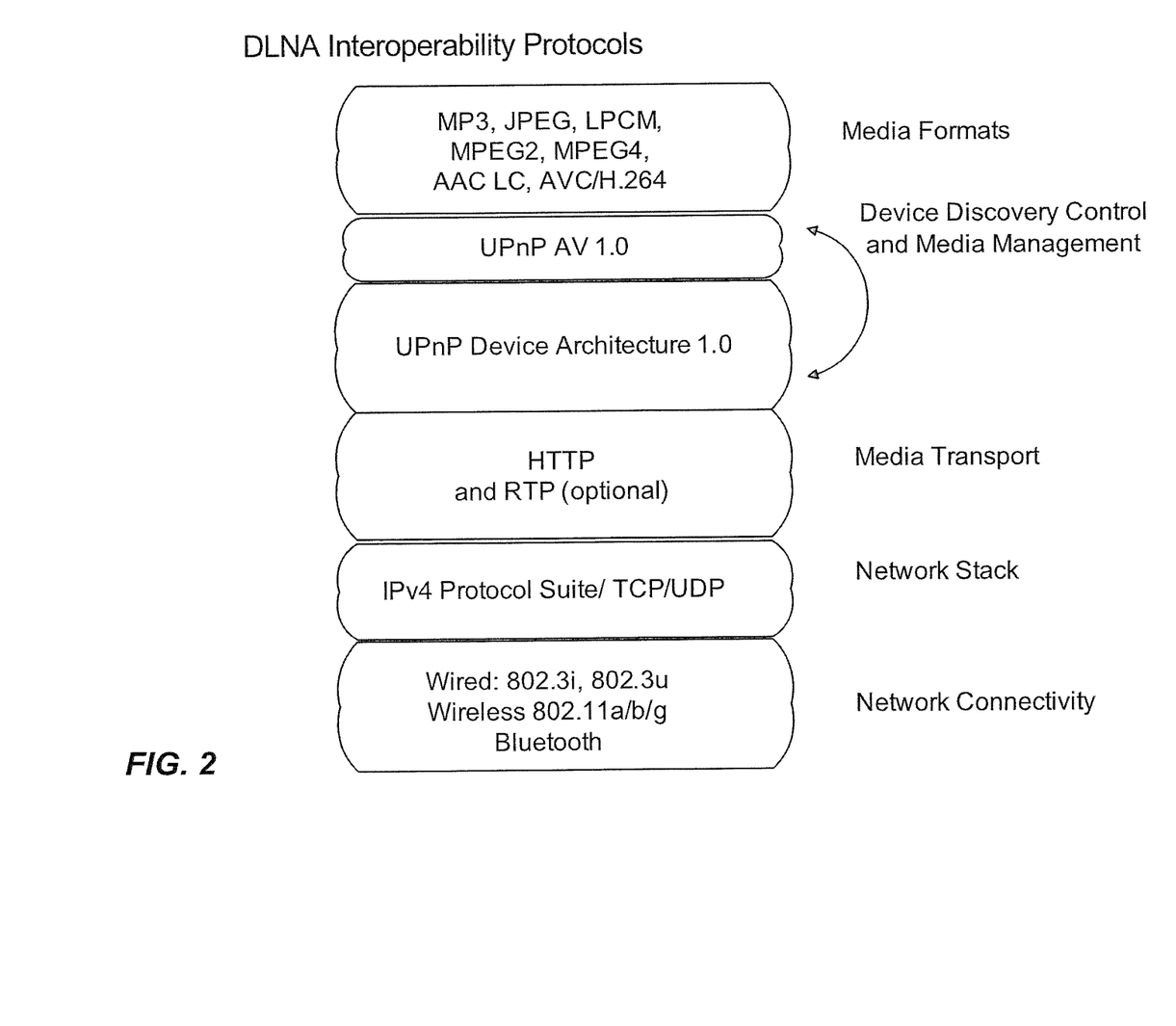
FIG. 2 is a list of example protocols that may be used by the devices in FIG. 1 and by embodiments of the present invention.
Figure 3:
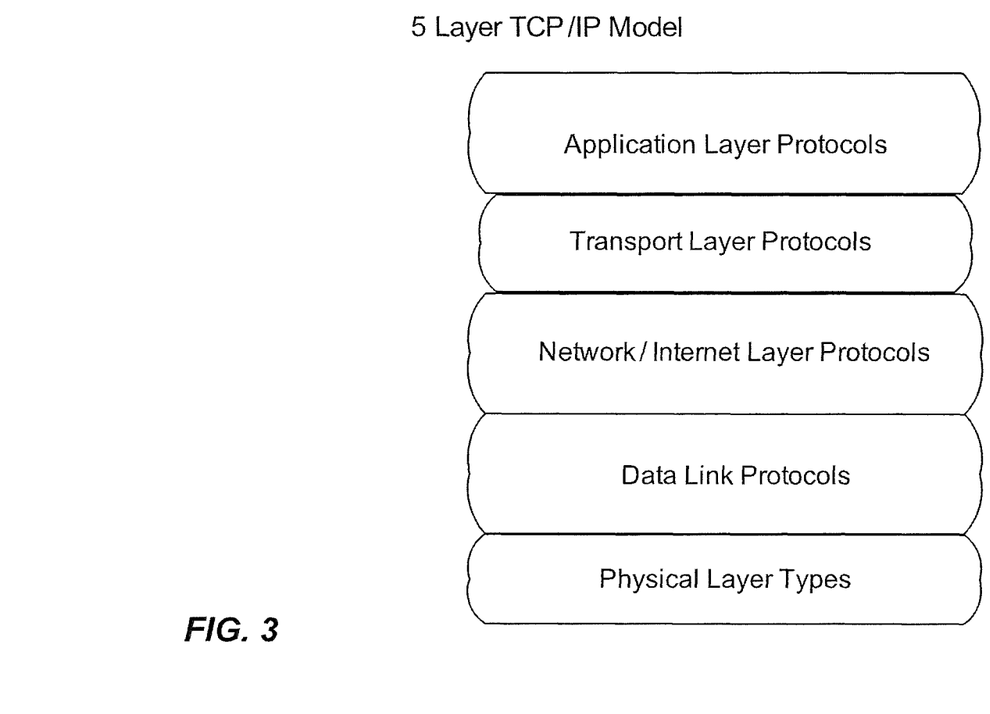
FIG. 3 is a diagram of one of the TCP/IP architecture models that can be used with embodiments of the present invention.

Organizations have been formed to create solutions with the goal of interoperability between devices such as the devices listed in FIG. 1. One such organization is the Digital Living Network Alliance (DNLA), introduced above, which issued a number of interoperability protocols. For example, in some embodiments, a device can enlist the DLNA interoperability protocols listed in FIG. 2, etc. to communicate with other devices. One embodiment may include identifying a media server, for example, at the network connectivity protocol layer and generating a rule to identify data associated with the media server in response to the identification based on any of the protocols listed above the network connectivity layer. In other embodiments, a device may communication with other devices using the TCP/IP protocol, a layer model of which is shown in FIG. 3. For example, one embodiment may include identifying a media server, for example, at the data link protocol layer and generating a rule to identify data associated with the media server in response to the identification based on any of the protocols listed above the network connectivity layer. The protocols listed in this description are not exhaustive but only examples of the types of protocols which can be used with embodiments of the present invention.

Figure 4:
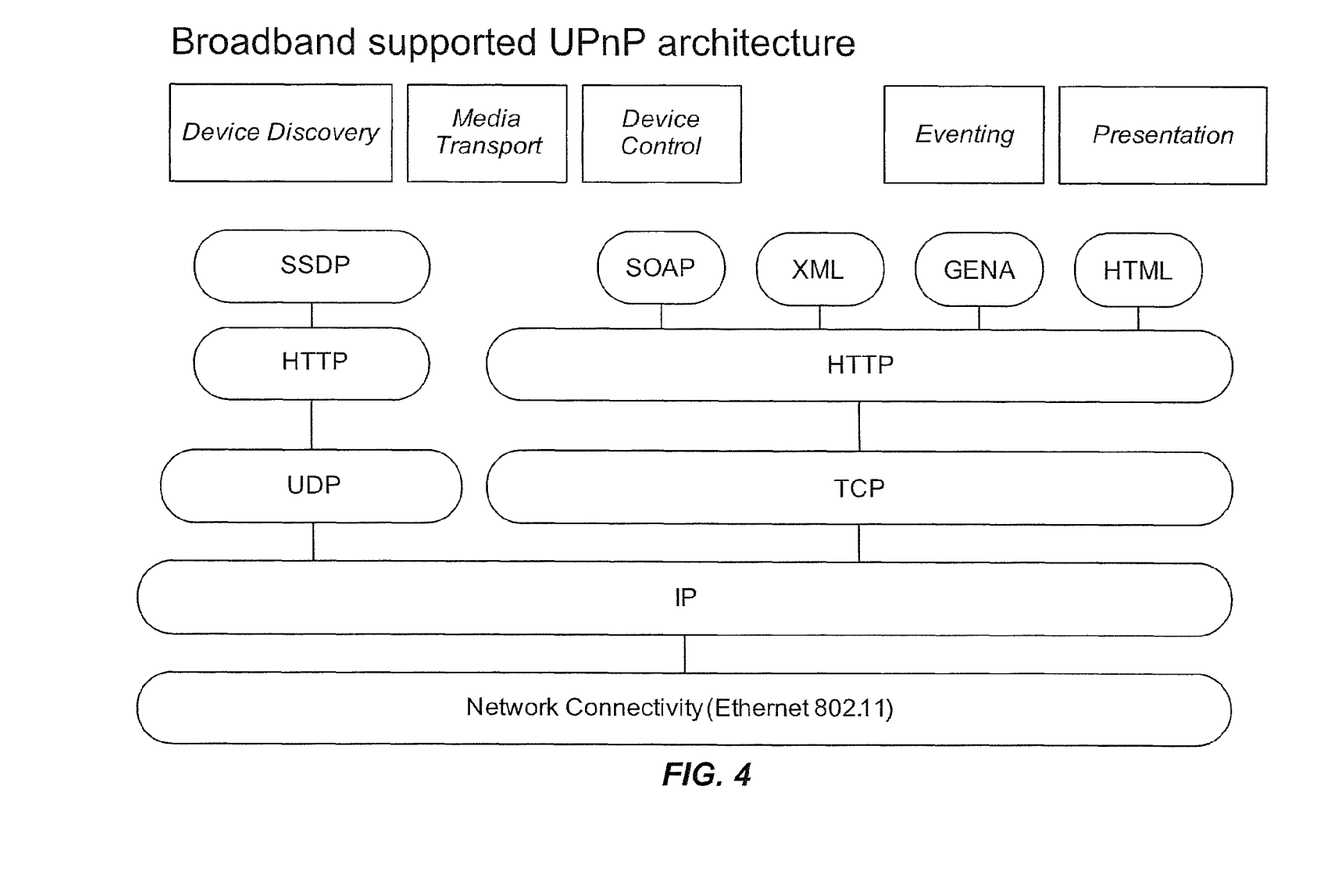
FIG. 4 is a diagram of an example UPnP architecture stack supported by some of the Broadband Cable Industry which may be used with embodiments of the present invention.

Broadband service providers may utilize a protocol tailored to their particular network infrastructure. For example, many cable television providers utilize the OPENCABLE™ protocol architecture published by the Cable Television Laboratories Inc. an shown generally in FIG. 4. These protocols are also available with embodiments of the invention. For example, one embodiment may include identifying a media server, for example, at the network connectivity layer and generating a rule to identify data associated with the media server in response to the identification based on any of the protocols listed above the network connectivity layer.

Figure 5:
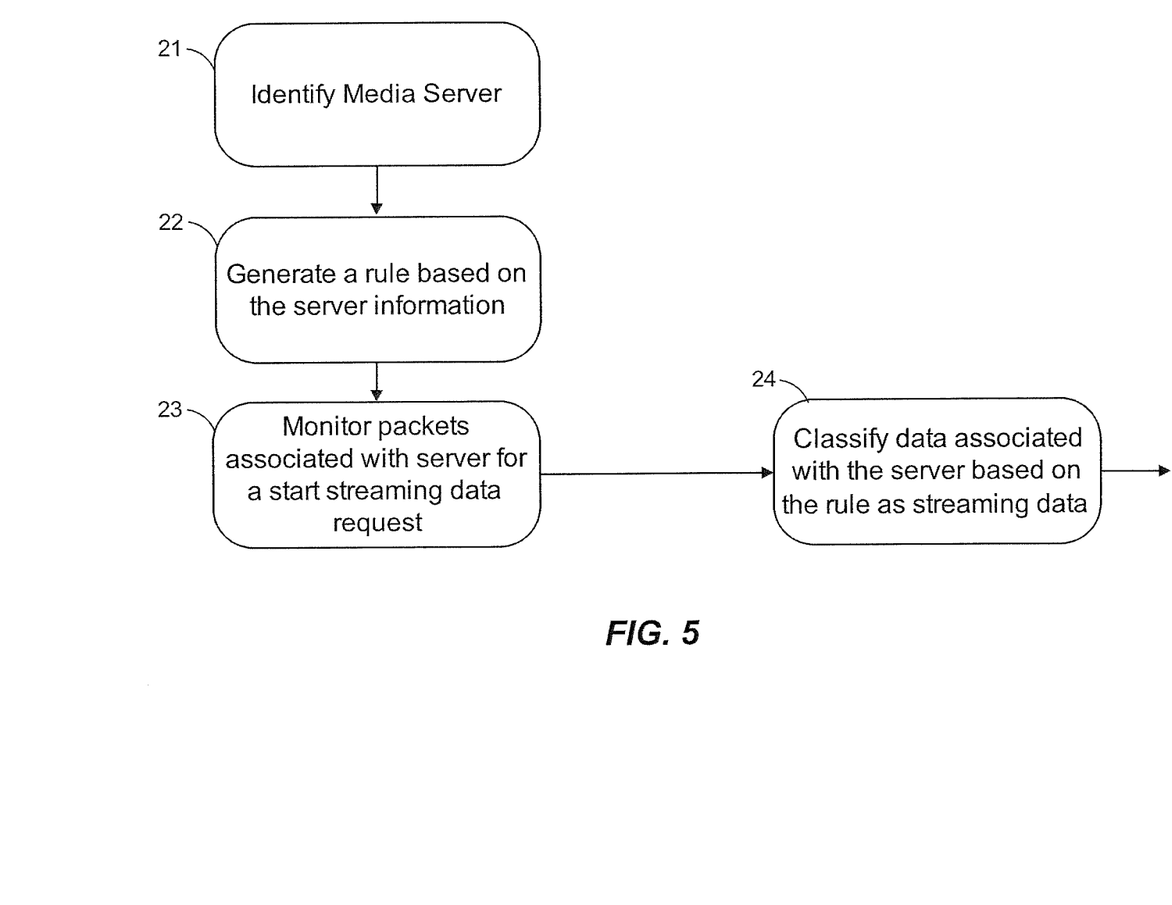
FIG. 5 is a flow diagram of an example method for classifying streaming media data.

FIG. 5 is a flow diagram of an example method of classifying streaming media data. The method may be implemented by any local wireless transmitting device or access point as shown in FIG. 1 or similar devices. At block 21, data that was or is to be transmitted is monitored for packets associated with a media server, etc. Such packets may include a server broadcast data message, a discovery request message, a discovery response message, a browsing/searching request, a browsing/searching response, a handshaking request, a handshaking response, a media server identification message, and a message responding to the media server identification message, etc. For example, one type of broadcast message may be of the DLNA/UPnP type, data link protocol type, Ethernet 802.11 type, etc.

Data can be monitored packet by packet or by a group of packets at a time, for example. There may be minimal knowledge of the traffic before the monitoring begins, or there may be some information about the network and devices for which to base the monitoring of the data. Assuming minimal information about the network and devices exists, block 21 may include identifying a media server based upon the type of protocol or other information used, for example. For instance, with Ethernet data, servers can be identified by the monitoring for broadcast or multicast or other specific types of messages, that a server or client would send using the Ethernet protocol. Other rules can be generated based on the protocol being used. For example, a client may send a discovery request via a broadcast to which a server may respond, the server may send notification of its presence via broadcasting, (e.g. DLNA/UPnP), a client may send browsing/searching requests to the server to obtain information of media residing on the server, to which the servers may respond, the client and server may set up video streaming via handshaking, etc.

By sniffing into the content of these messages, media servers and optionally clients that associate to the server can be identified. Also, protocols for the data transfer between the media server and a client can be identified.

Figure 6:
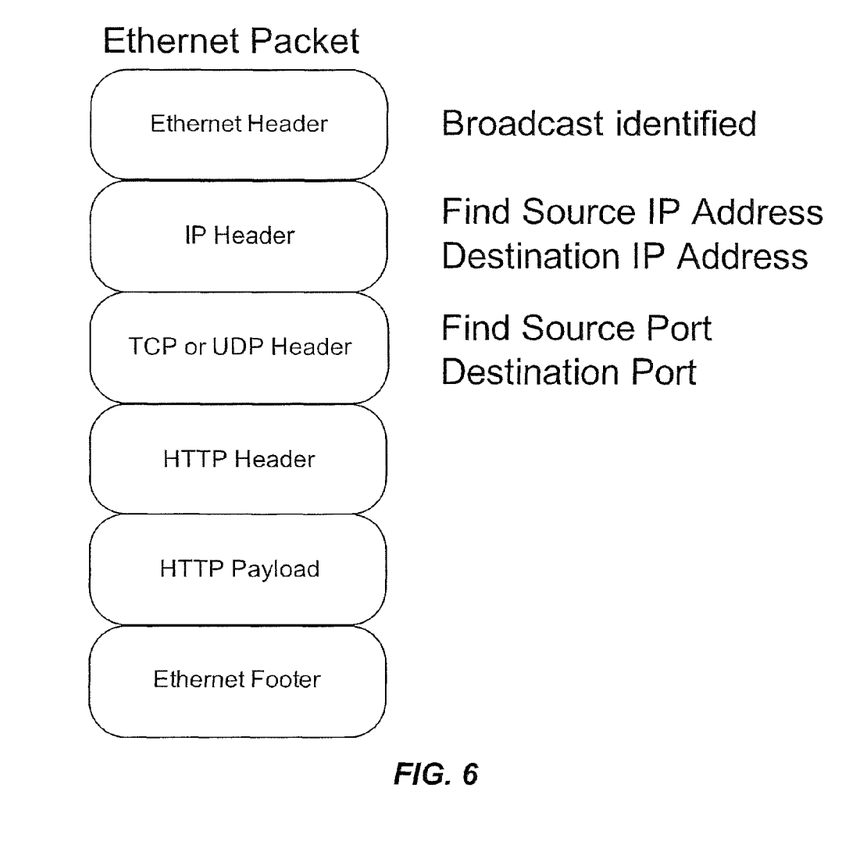
FIG. 6 is an example of a type of packet that can be monitored and used to transfer streaming media data.

FIG. 6 shows information of an example Ethernet data packet and example protocols which could be used in elements 21-24 of FIG. 5. For example, Ethernet is a carrier-sense multiple access with collision detection (CSMA/CD) technology that has broadcast messages directed to all devices on a network so that it is evident the device sending the broadcast message has the capability of transmitting or receiving streaming media data. The Ethernet header contains address information about the device that transmitted the broadcast message. Further in the Ethernet packet, other information such as the IP source/destination address and source/port, etc. can also be found.

Using information such as this example information, packets can be monitored and identified for specific addresses, protocols, messages, etc. and relationships can be identified between certain devices.

Referring again to FIG. 5, at block 22, one or more rules for identifying and/or classifying streaming media data associated with the identified media server can be generated based on information associated with the media server, such as an identifier of the media server, a port number of the server, the decoded media server identification (ID), etc. Such a rule, for example, may be to identify all data sent to and/or from the media server. Such a rule may be more complex, for example, such as to identify messages from the server that were sent according to a particular protocol, messages from the server that are a specific type of protocol message, etc. Such a rule may be, for example, identify all packet having IP source/destination addresses and port source/destinations numbers that correspond to the media server and a particular client device, etc. More generally, such a rule may be generated based on a variety of protocol information and other information that may be associated with a specific streaming media product or application. In one specific embodiment, a rule may be generated that is based on some set of one or more of the following: an IP address of the media server, an IP address of a particular client, a port number of the media server, and a port number of the client.

The rule or rules generated at the block 22 may be stored in a rules database. A server/client relationship database also may be built with the information obtained from the packets associated with the media server. For example, a packet sent in response to a media server message may be identified as having been sent by a device which acts as a client to the media server. An indication of this relationship may be stored in the relationship database. More generally, relationship information that may be stored may include indications of one-to one relationships, one-to many relationships, many-to-one relationships, many to many relationships, etc. A relationship database may be built with respect to a particular protocol such as IP. For example, IP source and IP destination relationships and port source/destination relationships may be built. Of course, the relationship database may be built using other types of information including information associated with other protocols.

At block 23, the packets associated with the media server are monitored for a start streaming media data request. For example, packets sent to the media server may be monitored for a start streaming media request, or packets sent to the media server from a particular client may be monitored for a start streaming media request. After determining that the start streaming media data request associated with the media server has been identified, then subsequent data associated with the media server can be classified as streaming media data at block 24 with use of at least one generated rule (block 22).

For example, packets that satisfy a rule or rules (generated at block 22) may be classified as streaming media data. This may permit the classified streaming media data to be sorted into a proper queue for QoS purposes. For instance, the streaming media data queue can have a different priority from other traffic so that the streaming media traffic can be transmitted via the wireless network at a higher priority. For example, streaming video data can be prioritized over other non-time critical data such as email data. The prioritized data can be sorted by any queuing technique.

In one specific embodiment, classification may comprise pattern matching. For example, a rule may comprise determining that a packet includes streaming media data based on whether the packet includes some specified set of one or more of a source IP address, a destination IP address, a source port number, a destination port number, and a protocol. In this embodiment, a 4 double word (4-DWORD) pattern may be generated by concatenating one or more of the following: an IP address of a particular source (e.g., a media server), an IP address of a particular destination (e.g., a client of the media server), a source port number, a destination port number, and an identifier of a protocol. If it is known that one or more of the above data will not be used for classification, that portion of the 4-DWORD may be filled with some filler data such as all zeros, all binary ones, alternating bits of zeros and ones, etc. Additionally, a 4-DWORD mask may be generated in which fields that are to be checked are filled with binary ones whereas fields that are not to be checked are filled with zeros, for example. In this way, a pattern matching rule can be represented as a 4-DWORD pattern (e.g., Pattern[4]) and optionally a 4-DWORD mask (e.g., PatternMask[4]).

When a packet is to be analyzed, the source IP address, the destination IP address, the source port number, thee destination port number, and a protocol identifier may be extracted used to create a 4-DWORD packet information data element (e.g., PacketInfo[4]). Then, this packet information data element can be exclusive-ORed with the 4-DWORD pattern and optionally ANDed with the 4-DWORD mask. This may be represented as:

$$\text{PatternMatchingResult} = ((\text{PacketInfo}[0] \wedge \text{Pattern}[0])$$
$$\&\text{PatternMask}[0]) || ((pui\text{PacketInfo}[1] \wedge \text{Pattern}[1]) \& \text{PatternMask}[1]) || ((pui\text{PacketInfo}[2] \wedge \text{Pattern}[2]) \& \text{PatternMask}[2]) || ((pui\text{PacketIn-fo}[3] \wedge \text{Pattern}[3]) \& \text{PatternMask}[3])$$ (Equ. 1)

If the result (PatternMatchingResult) is non-zero, the packet does not satisfy the rule.

Figure 7:
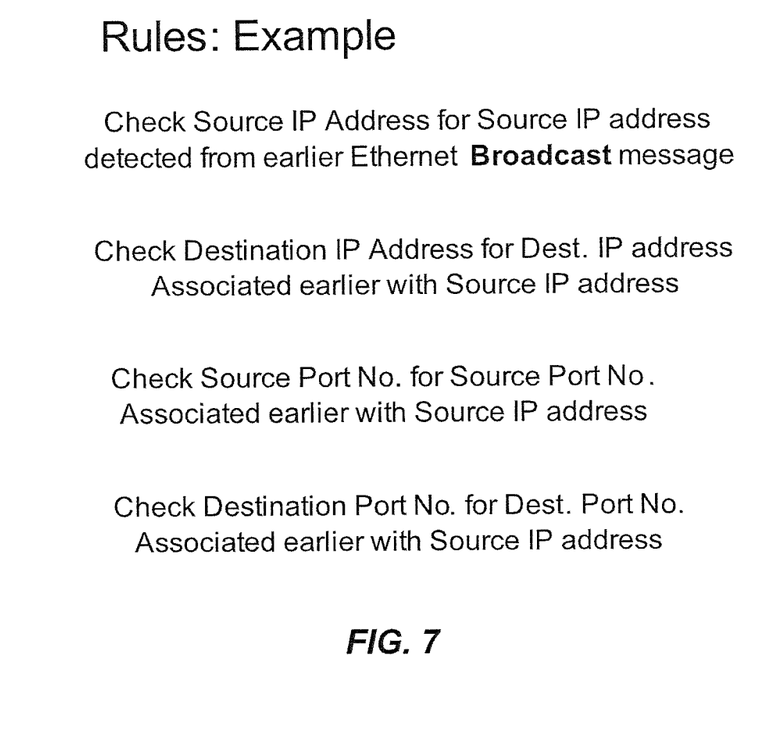
FIG. 7 is an example of the possible classification rules of FIG. 3.

FIG. 7 shows an example of classification rules that can be initialized or can be generated during operation in an embodiment of the present invention. As discussed above some minimum information may be used as initial rules. These rules can be generated with other information also as discussed above. For example, when a certain message or group of messages come across the streaming media data apparatus, other information can be extracted such as what device the particular message was destined for so that quicker monitoring of data can be accomplished. Such new information can be added to the existing rules or can make up a new rule or set of rules so that when the existing or new classification rules are met the data is more likely to be streaming media data than not.

Figure 8:
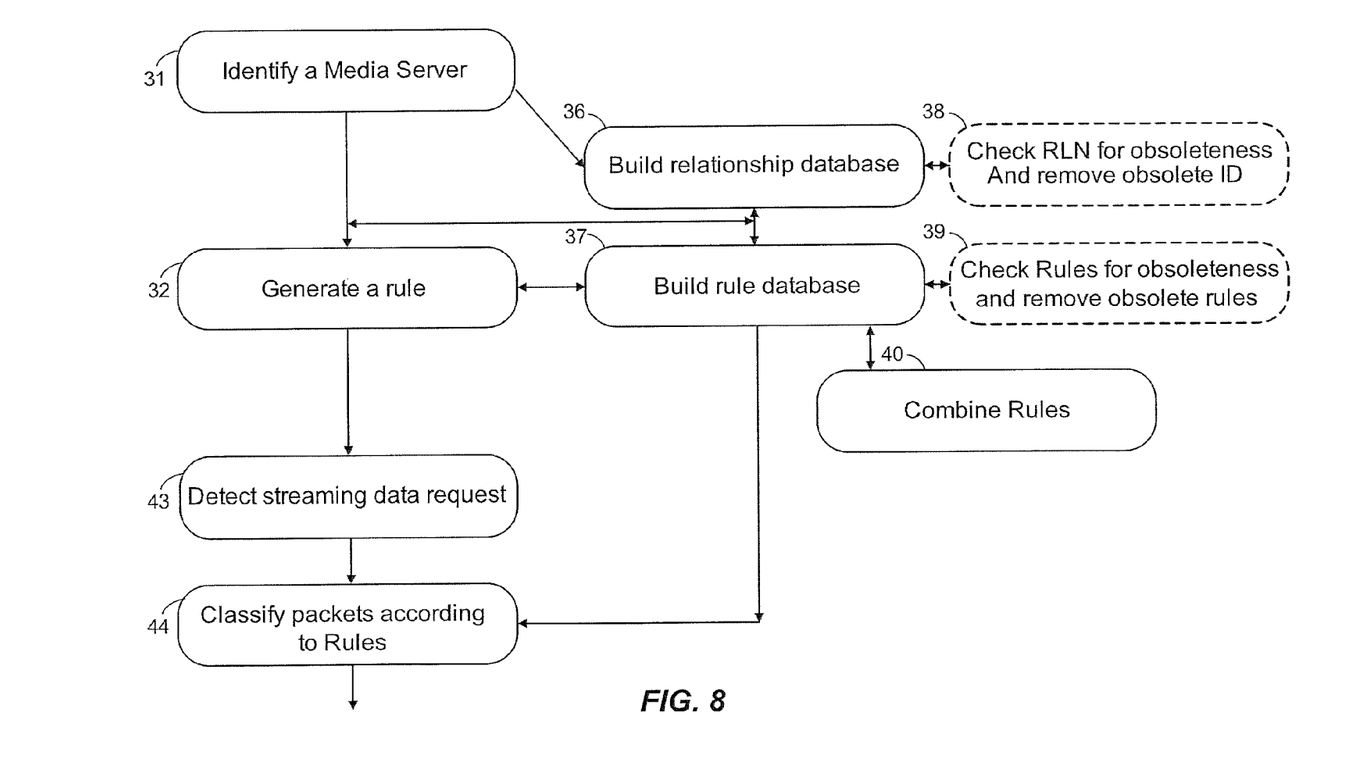
FIG. 8 is a flow diagram of another example method for classifying streaming media data.

FIG. 8 is a flow diagram of another example method of classifying streaming media data in which features are included to help increase efficiency by checking for obsoleteness of the rules and/or the database of the source/client relationships and/or combining rules.

The method includes identifying a device ID such as a media server at block 31 and generating a rule to identify data associated with the media server in response to identifying the media server at block 32, which may be the same or similar to the blocks 21 and 22, respectively, of FIG. 5. At a block 36, a client/server relationship database may be generated or modified. For example, messages to/from identified media servers may be monitored to identify clients that communicate with those media servers. Based on this information, server/client relationships may be identified and indications of these relationships may be stored in the client/server relationship database. Similarly, for any active media server, a client can be added to its client list if the client sends browsing/searching requests or other handshaking commands to the media server, for example. At a block 37, a rule database may be built or modified. For example, rules generated at block 32 may be added to the rule database, and the rule database may include rules that are being and/or will be used to classify messages as streaming media data. The relationship database and/or the rules database can also be setup with initial information and/or can be initialized.

At block 38, the relationship database can be checked for obsoleteness. As described above, the relationship database may maintain information regarding media server/client relationships. For instance, a list of active media servers may be maintained, as well as corresponding lists of clients associated with each of the media servers. One client may be associated with multiple media servers. When a server or client leaves the network, a cleanup of the relationship database may be done. This may include employing a timer. For example, every time a server or client is detected, the server or client may be refreshed in the database. A server or client that has not been refreshed for some period of time may be considered dormant. Dormant servers and/or clients may be removed from the relationship database, for example, periodically, when a new server and/or client is to be added, when a new server and/or client is to be added and there is no more storage available in the database, etc.

At block 39, rules can be checked for obsoleteness. For instance, a timer may be utilized so that if a rule has not been met for a given time period then that rule is determined obsolete. Obsolete rules may be removed, for example, periodically, when a new rule is ready to be added, when a new rule is ready to be added and there is no more storage available in the database, etc. A rule can also become obsolete, for example, when the streaming media data stops, the server/client changes IP address due to a reboot/DHCP negotiation, or shutdown, a media server leaves the network, etc.

Obsolete rules may be treated differently than obsolete servers and/or client because a rule may consumes much CPU power than a server/client list. Additionally, if a server/client is removed accidentally due to a network problem or a trick mode (pause/stop), the rules may not be generated correctly. Thus, it may be useful to remove obsolete rules more aggressively than removing obsolete clients or servers.

At block 40, rules may be combined and/or it may be determined that some rules need not be checked. For example, one of the rules in the rules database 37 may be a superset of another rule. For instance, a rule that checks only the source IP address for a particular server (first rule) may be a superset of a rule that checks both the source IP address (same value used by the first rule) and a destination IP address. This situation may happen when the same streaming server is running multiple protocols to communicate with different devices/clients. Though both rules may be added to the rules database, only the superset rule may be checked to avoid unnecessary checks to save central processing unit (CPU) power. Optionally, some rules may be checked only if a superset rule is satisfied. The rules may include pattern matching such as described above with respect to FIG. 5.

Similar to block 23 of FIG. 5, block 43 is used to check the data associated with a media server for a start streaming media data request. Then, similar to block 24 of FIG. 5, if a start streaming media data request is detected at block 43, block 44 is used to classify data associated with the server based on at least one rule and based on the detection of the start streaming media data request as streaming media data.

If a superset rule is satisfied, the packet may be counted as traffic for all the subset rules associated with the superset rule so that the subset rules will not become obsolete. Alternatively, only if a superset rule is satisfied, subset rules may be checked.

Figure 9:
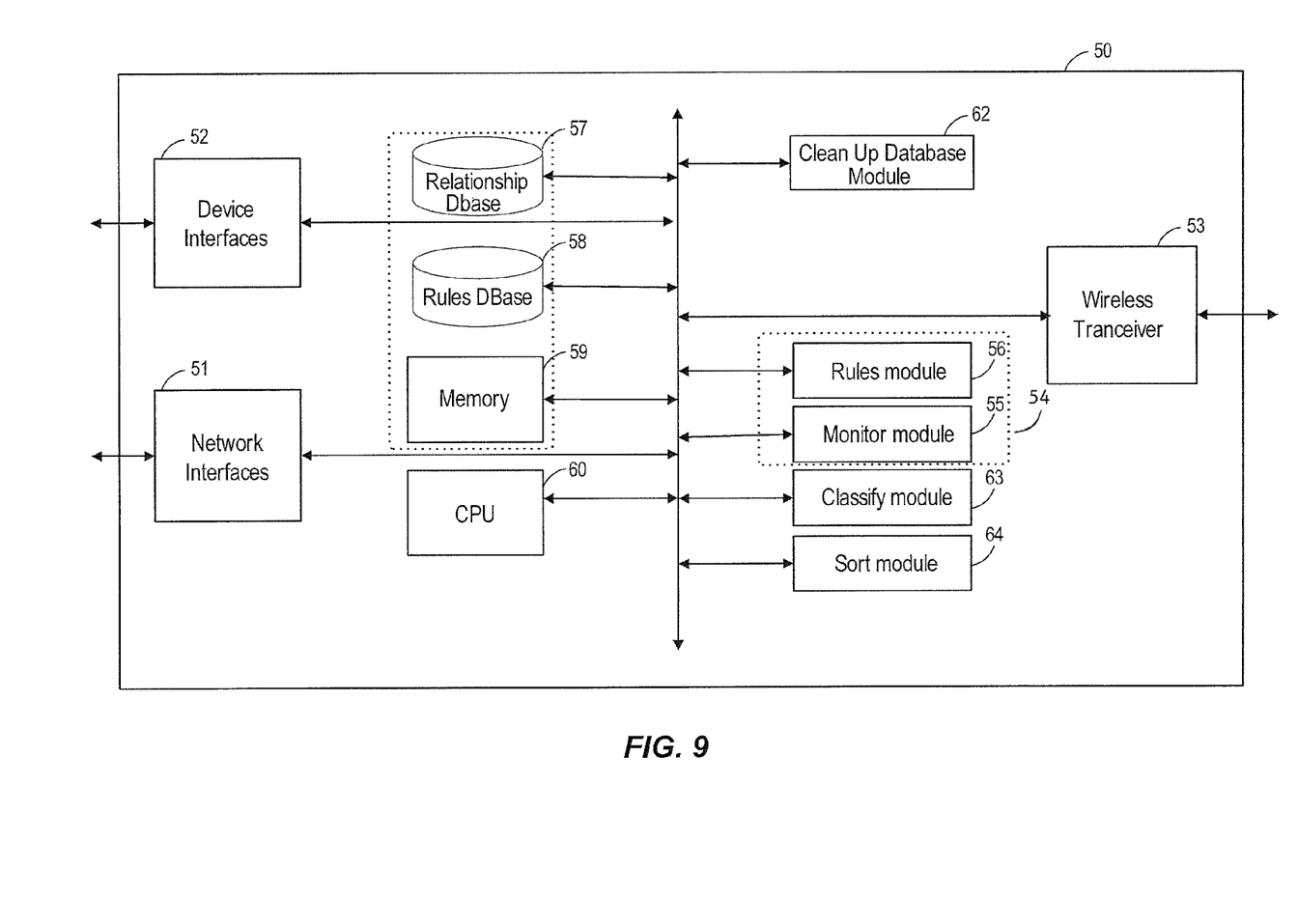
FIG. 9 is a diagram of an example embodiment of an apparatus capable of performing classification of streaming media data.

FIG. 9 shows an embodiment of an apparatus 50 that is capable of classifying the streaming media data as described above. For example, the apparatus 50 may implement the method of FIG. 5, the method of FIG. 8, a method similar to the method of FIG. 5 and/or the method of FIG. 8, etc. Of course, the methods of FIG. 5 and FIG. 8 may be implemented by a device different than the apparatus 50. The apparatus 50 may be a wireless AP, for example.

The apparatus 50 includes a central processing unit (CPU) 60, memory 59, databases 57, 58, interfaces 52, 51, 53, packet processor 54 and modules 55, 56, 62, 63, 64. Data traffic can be transmitted to or received from devices such as one or more of the devices 1-14 listed in FIG. 1A via a network interface 51, a device interface 52, the wireless transceiver 53, etc. Data messages received from or to be transmitted via the wireless transceiver 53 may be processed by the monitor module 55 alone or in combination with the rules module 56 in the form of software, firmware or some combination of hardware, software, and/or firmware. Blocks 21-23 of FIG. 2 and blocks 31-34 of FIG. 5 can be implemented by monitor module 55 alone or in with rules module 56. The monitor module 55 can store information in the relationship and rules databases 57, 58, for example. The monitor module 55 can communicate with the rules module 56 to generate rules from information gathered by the monitor module 55. The clean up database module 62 can be used to update the relationship and rules databases 57, 58.

At least some of the blocks of FIGS. 5, 8 and 9 may be implemented in hardware. For example, some or all of each of the blocks 21, 23, 24, 31, 43 and 44 may be implemented in, for example, a custom integrated circuit (IC), an application specific integrated circuit (ASIC), a field programmable logic array (FPGA), a programmable logic array (PLA), etc. Additionally or alternatively, some or all of each of the blocks 21, 23, 24, 31, 43 and 44 may be implemented in software stored in, for example, a memory and implemented on a processor or implemented in firmware as desired. Each of the rest of the blocks may be implemented in hardware, software, firmware or some combination of hardware, software, and/or firmware. If implemented in software, the routines may be stored in any computer readable memory such as in RAM, ROM, flash memory, a magnetic disk, a laser disk, or other storage medium. Likewise, this software may be delivered to a device (such as a wireless AP) via any known or desired delivery method including, for example, over a communication channel such as a telephone line, the Internet, a wireless connection, etc., or via a transportable medium, such as a computer readable disk, flash drive, etc. Delivery methods may include, for example, delivery on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software may be delivered to a user or a system via a communication channel such as a telephone line, a DSL line, a cable television line, a wireless communication channel, the Internet, etc. (which are viewed as being the same as or interchangeable with providing such software via a transportable storage medium).

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A method of classifying, at a wireless access point (AP), streaming media data, the method comprising:
   identifying, at the wireless AP, one or more media servers;
   in response to identifying the one or more media servers, adding, at the wireless AP, the one or more media servers to a list of media servers maintained at the wireless AP;
   determining, at the wireless AP, that one or more messages sent by one or more clients are sent to a first media server included on the list of media servers;
   in response to determining that the one or more messages sent by the one or more clients are sent to the first media server included on the list of media servers, adding, at the wireless AP, the one or more clients to a list of clients that is (i) maintained at the wireless AP and (ii) associated with the first media server;
   determining, at the wireless AP, that a request for streaming media is sent to the first media server included on the list of media servers by a first client included on the list of clients associated with the first media server;
   in response to determining that the request for streaming media is sent to the first media server included on the list of media servers by the first client included on the list of clients, utilizing, at the wireless AP, a rule to determine whether subsequent traffic between the first media server included on the list of media servers and the first client included on the list of clients is streaming media traffic; and
   classifying, at the wireless AP, data packets within the subsequent traffic as high priority when the data packets satisfy the rule.

2. The method of claim 1, wherein identifying the one or more media servers includes identifying the first media server based on at least one of:
   a discovery request sent to the first media server;
   a discovery response sent by the first media server;
   a browsing/searching request sent to the first media server;
   a browsing/searching response sent by the first media server;
   a handshaking message sent to the first media server; or
   a handshaking message sent by the first media server.

3. The method of claim 1, wherein identifying the one or more media servers includes identifying the first media server by detecting a notification broadcast by the first media server.

4. The method of claim 1, wherein determining that one or more messages sent by one or more clients are sent to the first media server included on the list of media servers includes detecting at least one of:
   a browsing/searching request sent to the first media server by the first client; or
   a handshaking message sent to the first media server by the first client.

5. The method of claim 1, wherein utilizing a rule to determine whether subsequent traffic between the first media server included on the list of media servers and the first client included on the list of clients is streaming media traffic includes determining whether each data packet within the subsequent traffic has at least one of:
   a source Internet Protocol (IP) address matching a pattern associated with the rule;
   a destination IP address matching a pattern associated with the rule;
   a source Transmission Control Protocol (TCP) port number matching a pattern associated with the rule;
   a destination TCP port number matching a pattern associated with the rule;
   a source User Datagram Protocol (UDP) port number matching a pattern associated with the rule; or
   a destination UDP port number matching a pattern associated with the rule.

6. The method of claim 1, wherein, for each data packet within the subsequent traffic:
   utilizing a rule to determine whether subsequent traffic between the first media server included on the list of media servers and the first client included on the list of clients is streaming media traffic includes
      generating a pattern based on two or more of (i) a source Internet Protocol (IP) address of the data packet, (ii) a destination IP address of the data packet, (iii) a source Transmission Control Protocol (TCP) port number of the data packet, (iv) a destination TCP port number of the data packet, (v) a source User Datagram Protocol (UDP) port number of the data packet, or (vi) a destination UDP port number of the data packet, and
      determining whether the pattern matches a pattern associated with the rule; and
   classifying the data packets within the subsequent traffic as high priority when the data packets satisfy the rule includes classifying the data packet as high priority when it is determined that the pattern matches the pattern associated with the rule.

7. The method of claim 1, wherein the rule is a first rule stored in a rules database, and wherein the method further comprises:
   determining that a second rule stored in the rules database is obsolete; and
   in response to determining that the second rule is obsolete, removing the second rule from the rules database.

8. The method of claim 7, wherein determining that the second rule is obsolete includes determining that the second rule has not been met for a predetermined time period.

9. The method of claim 1, wherein utilizing a rule to determine whether subsequent traffic between the first media server included on the list of media servers and the first client included on the list of clients is streaming media traffic includes, for each data packet within the subsequent traffic:
   determining whether the data packet satisfies a superset rule; and
   when it is determined that the data packet satisfies the superset rule, determining whether the data packet satisfies a rule associated with the superset rule.

10. A wireless access point (AP) device comprising:
   a relationship database configured to store (i) a list of media servers and (ii) a respective list of clients for each media server on the list of media servers;
   a rules database configured to store a plurality of rules;
   a monitor module configured to
      identify one or more media servers,
      in response to the monitor module identifying the one or more media servers, add the one or more media servers to the list of media servers,
      determine that one or more messages sent by one or more clients are sent to a first media server included on the list of media servers, in response to the monitor module determining that the one or more messages sent by the one or more clients are sent to the first media server included on the list of media servers, add the one or more clients to the list of clients that is (i) stored in the relationship database and (ii) associated with the first media server, and determine that a request for streaming media is sent to the first media server included on the list of media servers by a first client included on the list of clients associated with the first media server; and a classification module configured to in response to the monitor module determining that the request for streaming media is sent to the first media server included on the list of media servers by the first client included on the list of clients, utilize a rule to determine whether subsequent traffic between the first media server included on the list of media servers and the first client included on the list of clients is streaming media traffic, and classify data packets within the subsequent traffic as high priority when the data packets satisfy the rule.

11. The wireless AP device of claim 10, wherein the monitor module is configured to identify the one or more media servers at least by identifying the first media server based on at least one of:

a discovery request sent to the first media server;
a discovery response sent by the first media server;
a browsing/searching request sent to the first media server;
a browsing/searching response sent by the first media server;
a handshaking message sent to the first media server; or
a handshaking message sent by the first media server.

12. The wireless AP device of claim 10, wherein the monitor module is configured to determine that one or more messages sent by one or more clients are sent to the first media server at least by detecting at least one of:

a browsing/searching request sent to the first media server by the first client; or
a handshaking message sent to the first media server by the first client.

13. The wireless AP device of claim 10, wherein the classification module is configured to utilize a rule to determine whether subsequent traffic between the first media server included on the list of media servers and the first client included on the list of clients is streaming media traffic at least by determining whether each data packet within the subsequent traffic has at least one of:

a source Internet Protocol (IP) address matching a pattern associated with the rule;
a destination IP address matching a pattern associated with the rule;
a source Transmission Control Protocol (TCP) port number matching a pattern associated with the rule;
a destination TCP port number matching a pattern associated with the rule;
a source User Datagram Protocol (UDP) port number matching a pattern associated with the rule; or
a destination UDP port number matching a pattern associated with the rule.

14. The wireless AP device of claim 10, wherein, for each data packet within the subsequent traffic:

the monitor module is configured to utilize a rule to determine whether subsequent traffic between the first media server included on the list of media servers and the first client included on the list of clients is streaming media traffic at least by generating a pattern based on two or more of (i) a source Internet Protocol (IP) address of the data packet, (ii) a destination IP address of the data packet, (iii) a source Transmission Control Protocol (TCP) port number of the data packet, (iv) a destination TCP port number of the data packet, (v) a source User Datagram Protocol (UDP) port number of the data packet, or (vi) a destination UDP port number of the data packet, and
determining whether the pattern matches a pattern associated with the rule; and the classification module is configured to classify the data packets within the subsequent traffic as high priority when the data packets satisfy the rule at least by classifying the data packet as high priority when it is determined that the pattern matches the pattern associated with the rule.

15. The wireless AP device of claim 10, wherein the classification module is configured to utilize a rule to determine whether subsequent traffic between the first media server included on the list of media servers and the first client included on the list of clients is streaming media traffic at least by, for each data packet within the subsequent traffic:

determining whether the data packet satisfies a superset rule; and
when it is determined that the data packet satisfies the superset rule, determining whether the data packet satisfies a rule associated with the superset rule.

16. A tangible, non-transitory computer-readable memory storing instructions that, when executed by one or more processors, cause the one or more processors to:

identify one or more media servers;
in response to identifying the one or more media servers, add the one or more media servers to a list of media servers maintained at a wireless access point (AP);
determine that one or more messages sent by one or more clients are sent to a first media server included on the list of media servers;
in response to determining that the one or more messages sent by the one or more clients are sent to the first media server included on the list of media servers, add the one or more clients to a list of clients that is (i) maintained at the wireless AP and (ii) associated with the first media server;
determine that a request for streaming media is sent to the first media server included on the list of media servers by a first client included on the list of clients associated with the first media server;
in response to determining that the request for streaming media is sent to the first media server included on the list of media servers by the first client included on the list of clients, utilize a rule to determine whether subsequent traffic between the first media server included on the list of media servers and the first client included on the list of clients is streaming media traffic; and
classify data packets within the subsequent traffic as high priority when the data packets satisfy the rule.

17. The tangible, non-transitory computer-readable memory of claim 16, wherein the instructions cause the one or more processors to determine that one or more messages sent by the one or more clients are sent to the first media server included on the list of media servers at least by detecting at least one of:

a browsing/searching request sent to the first media server by the first client; or
a handshaking message sent to the first media server by the first client.

18. The tangible, non-transitory computer-readable memory of claim 16, wherein the instructions cause the one or more processors to utilize a rule to determine whether subsequent traffic between the first media server included on the list of media servers and the first client included on the list of clients is streaming media traffic at least by determining whether each data packet within the subsequent traffic has at least one of:

a source Internet Protocol (IP) address matching a pattern associated with the rule;
  a destination IP address matching a pattern associated with the rule;
  a source Transmission Control Protocol (TCP) port number matching a pattern associated with the rule;
  a destination TCP port number matching a pattern associated with the rule;
  a source User Datagram Protocol (UDP) port number matching a pattern associated with the rule; or
  a destination UDP port number matching a pattern associated with the rule.

19. The tangible, non-transitory computer-readable memory of claim 16, wherein the instructions cause the one or more processors to, for each data packet within the subsequent traffic:

utilize a rule to determine whether subsequent traffic between the first media server included on the list of media servers and the first client included on the list of clients is streaming media traffic at least by generating a pattern based on two or more of (i) a source Internet Protocol (IP) address of the data packet, (ii) a destination IP address of the data packet, (iii) a source Transmission Control Protocol (TCP) port number of the data packet, (iv) a destination TCP port number of the data packet, (v) a source User Datagram Protocol (UDP) port number of the data packet, or (vi) a destination UDP port number of the data packet, and
  determining whether the pattern matches a pattern associated with the rule; and
  classify the data packets within the subsequent traffic as high priority when the data packets satisfy the rule at least by classifying the data packet as high priority when it is determined that the pattern matches the pattern associated with the rule.

20. The tangible, non-transitory computer-readable memory of claim 16, wherein the instructions cause the one or more processors to utilize a rule to determine whether subsequent traffic between the first media server included on the list of media servers and the first client included on the list of clients is streaming media traffic at least by, for each data packet within the subsequent traffic:

determining whether the data packet satisfies a superset rule; and
  when it is determined that the data packet satisfies the superset rule, determining whether the data packet satisfies a rule associated with the superset rule.

\* \* \* \* \*